Aug. 1, 1950 — E. R. SCHMELING — 2,517,448

PICNIC FORK

Filed May 24, 1947

Inventor
Ernest R. Schmeling

Patented Aug. 1, 1950

2,517,448

UNITED STATES PATENT OFFICE 2,517,448

PICNIC FORK

Ernest R. Schmeling, Union, Mich.

Application May 24, 1947, Serial No. 750,292

3 Claims. (Cl. 99—421)

This invention relates to improvements in forks of the type commonly known as picnic forks and used by picnickers for roasting various articles of food impaled on the prongs of the fork over an open fire.

Such forks generally comprise an elongated shank usually made of relatively stiff wire and having a handle at one end and prongs at its other end upon which the articles of food to be roasted may be impaled.

In use such forks are usually held by their handle portions in cantilever fashion with the pronged end of the fork at an elevation above the ground and over a fire to subject the food thereon to cooking temperatures.

It is well known that quite a little care must be exercised in roasting food over an open fire in this manner. If the picnicker holds the fork carelessly and allows the food impaled on its prongs to approach too closely the source of heat, the food is often scorched or burned on its exterior while insufficiently cooked inside.

There is obviously a single most desirable elevation at which the food should be held above the fire so as to subject the same to the proper degree of heat for thorough cooking without scorching. Moreover, the best results are obtained when the fork is slowly turned on its axis to uniformly present all sides of the food to the source of heat while holding the food at the proper elevation above the fire.

Needless to say, the proper roasting of food over an open fire by the use of picnic forks is an exceedingly tiresome undertaking and one which is very apt to lead all but the most patient into careless acts which impair the flavor of the food. Although the picnic forks used in the past have been comparatively light, the cantilever fashion in which they had to be held soon resulted in severe strain on the picnicker and frequently induced him to curtail the cooking process and consume the partly cooked food. From this it will be seen that the duration of the cooking operation was more likely to be determined by the degree of fatigue of the picnicker brought about by the necessity of holding the fork, than by the state of the article being cooked.

Bearing in mind these objections to past picnic forks, and particularly the manner of their use, it is an object of this invention to provide an improved picnic fork by which the user will be relieved of substantially the entire weight of the fork and hence enabled to more diligently present the food to be cooked to the source of heat.

More specifically it is an object of this invention to provide a picnic fork of the character described with a supporting stake so connected with the shank of the fork that when the stake is driven into the ground the fork will be self-supporting to the extent that the shank may have its handle portion rest on the ground and its pronged end held at any desired elevation above a source of heat to subject food thereon to the most advantageous cooking temperature.

Still another object of this invention resides in the provision of a supporting stake for picnic forks connected thereto in a manner providing a fulcrum for the shank of the fork when the stake is driven into the ground enabling the user to hold and control the fork with a minimum of effort.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates two complete examples of the physical embodiment of the invention constructed according to the best modes so far devised for the practical application of the principles thereof, and in which.

Referring now more particularly to the accompanying drawing in which like numerals indicate like parts, the numeral 5 generally designates the fork of this invention. As is customary, the fork comprises an elongated shank 6 having prongs 7 at one end thereof and having a handle grip 8 at its opposite end.

Figure 2:
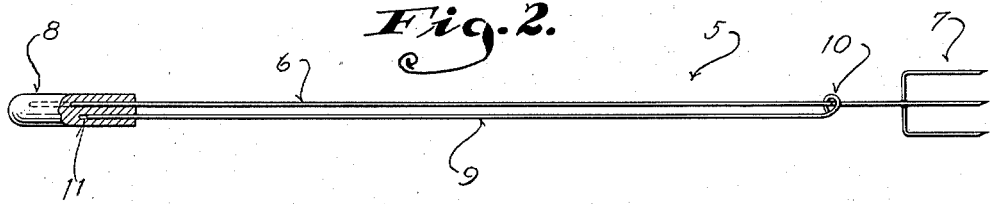
Figure 2 is an enlarged side elevational view of the fork of this invention showing the stake held in an inoperative position alongside the shank of the fork, portions of the handle being broken away and shown in section to illustrate the means for retaining the stake in said inoperative position.
Figure 3:
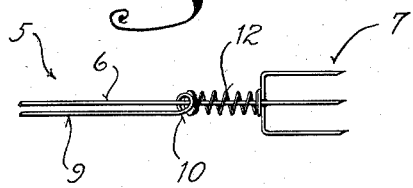
Figure 3 is a view similar to Figure 2 showing a slightly modified embodiment of the invention.

The shank 6 is preferably made of relatively stiff wire and has its handle portion permanently embedded in the handle grip 8 as will be apparent from a consideration of Figure 2.

According to this invention the fork is provided with a supporting stake 9 likewise preferably made of stiff wire. The stake is connected to the shank 6 of the fork by means of an eye 10 formed on one end of the stake and loosely encircling the shank 6 so as to provide a substantially universal-sliding connection between the stake and shank. This connection enables the eye to act as a fulcrum on which the shank may be supported at any desired elevation above the ground and at any point along its length when the free end of the stake is driven into the ground as illustrated in Figure 1.

Figure 1:
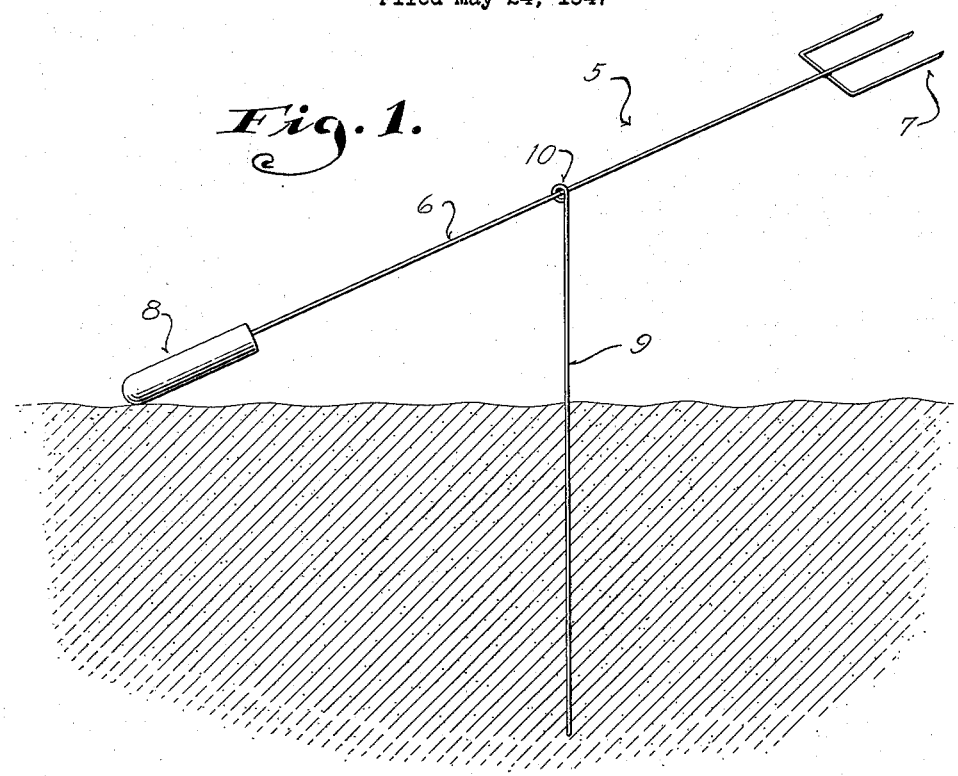
Figure 1 is a view partly in elevation and partly in section illustrating one manner in which the improved picnic fork of this invention may be used.

One manner in which the fork may be used and in which the fork is self-supporting is illustrated in Figure 1 where it is seen that the handle grip 8 of the fork is engaged with the ground and the shank of the fork held at an upward inclination toward its pronged end by engagement thereof in the eye 10 of the stake at a point on the shank somewhat closer to the pronged end of the fork than the handle end thereof. This disposes the pronged end at an elevation above the source of heat, usually an open fire, and it will be apparent that the elevation of the pronged end of the fork may be adjusted at will either by lengthwise sliding of the shank through the eye or by varying the depth to which the stake is driven into the ground.

More accurate positioning of the pronged end of the fork over the fire or other source of heat is, of course, possible by manually holding the handle grip 8 off the ground and utilizing the connection afforded by the eye 10 as a fulcrum so that the picnicker is substantially relieved of the weight of the fork but is enabled to accurately control the height of the pronged end thereof either by elevating or depressing the handle end of the fork to the desired degree.

The eye 10 by which the stake is connected to the shank of the fork also readily permits rotation of the shank on its axis to present different surfaces of the food impaled on the prongs of the fork to the source of heat.

When not in use, the stake 9 may be swung about its connection with the shank to a position directly alongside and substantially parallel to the shank, and retained in such an inoperative position by sliding the stake rearwardly along the shank toward the handle grip 8 so as to engage the free end of the stake in a socket 11 formed in the handle alongside the handle portion of the shank. This socket is preferably designed to closely fit the free end of the stake so as to frictionally engage the same and thereby preclude accidental displacement of the stake from the socket.

The retaining means for holding the stake in its inoperative condition shown in Figure 2 is highly advantageous in that it facilitates transportation of the fork of this invention from place to place.

If desired, additional assurance against displacement of the free end of the stake from the retaining socket 11 may be had by confining a compression spring 12 between the eye on the stake and the prongs on the outer end of the shank. In this respect it will be appreciated that the length of the stake 9 is such that when its free end is embedded in the socket 11 of the handle, there will be just sufficient space between the eye 10 on the stake and the prongs 7 as to permit disengagement of the end of the stake from the socket, allowing, of course, for the compressed length of the spring 12.

From the foregoing description taken in connection with the accompanying drawing, it will be readily apparent that this invention provides a picnic fork having many advantages over past forks in that the provision of the supporting stake therefor enables the fork to be self-supporting in use or to at least relieve the picnicker of substantially the entire weight of the fork.

I claim:
1. A picnic fork of the type having a shank provided with a handle portion at one end and prongs at the other, characterized by the provision of a supporting stake joined at one end to the shank by a connection affording unrestricted rotation of the shank on its axis relative to the stake and enabling swinging motion of the stake to and from an inoperative position alongside and substantially parallel to the shank of the fork, and further characterized by the provision of means for releasably holding the stake in said inoperative position including a socket in the handle to receive the free end of the stake, and a compression spring encircling the shank of the fork and confined between the pronged end thereof and the end of the stake connecting with the shank for yieldingly maintaining said free end of the stake engaged in the socket of the handle.

2. As an article of manufacture, a picnic fork comprising: a shank having prongs at one end and a handle at the other; a supporting stake having an eye at one end loosely encircling the shank of the fork to provide a pivotal and sliding connection between the stake and shank by which the stake is slidable axially along said shank between limits defined by the handle and prongs at the opposite ends of the shank; and a socket in the handle to receive the opposite free end of the stake and releasably maintain the same in an inoperative position lying lengthwise alongside the shank.

3. A picnic fork of the type having a shank provided with a handle portion at one end and prongs at the other, characterized by the provision of a supporting stake joined at one end to the shank by a connection affording unrestricted rotation of the shank on its axis relative to the stake, and which stake is adapted to have its opposite end driven into the ground to enable the fork to be supported by the stake with the pronged end of the fork at an elevation above the ground, said connection providing for swinging motion of the stake to and from an inoperative position alongside and substantially parallel to the shank of the fork; and means for releasably holding the stake in said inoperative position comprising a socket in the handle to receive said opposite end of the stake and by frictional engagement therewith retain the stake in said inoperative position against accidental displacement from the socket.

ERNEST R. SCHMELING.

REFERENCES CITED

The following references are of record in the file of this patent:

UNITED STATES PATENTS

| Number | Name | Date |
|---|---|---|
| 462,918 | Zabel | Nov. 10, 1891 |
| 568,962 | Skeels | Oct. 6, 1896 |
| 1,384,250 | Froom | July 12, 1921 |
| 2,136,658 | Westberg et al. | Nov. 15, 1938 |
| 2,191,226 | Clem | Feb. 20, 1940 |
| 2,486,345 | Triulzi | Oct. 25, 1949 |

FOREIGN PATENTS

| Number | Country | Date |
|---|---|---|
| 19,462 | Great Britain | Oct. 30, 1900 |
| 410,274 | Germany | June 7, 1923 |